Patented Sept. 15, 1953

2,652,354

UNITED STATES PATENT OFFICE 2,652,354

METHOD OF UNITING SOLIDS WITH THE AID OF BINDING AND ADHESIVE AGENTS

Ian Gordon Cumming Dryden, Wallington, and James Hunter McKee, Ashtead, England, assignors to C. U. R. A. Patents Limited, Leatherhead, Surrey, England, a British company No Drawing. Application November 3, 1950, Serial No. 194,039. In Great Britain November 4, 1949

28 Claims. (Cl. 154—142)

This invention relates to a method of uniting solids with the aid of binding and adhesive agents. Such method includes uniting solid particles by means of a binding agent to produce solid masses, for example, the "green" moulded bodies formed from a plastic composition containing ceramic particles in preparation for firing in the manufacture of ceramic (including refractory) articles, the moulded bodies having sufficient strength (hereinafter referred to as "green" strength) to withstand handling and maintain their shape prior to the final hardening resulting from firing. Further examples of such solid masses are moulded articles formed of bonded particles of carbon with or without filling materials, and briquettes of bonded particles of solid carbonaceous fuels. The method also includes uniting the surfaces of shaped structures by means of an adhesive, for example, uniting moulded structures formed of bonded particles of carbon.

We have found that aliphatic and araliphatic amines have the property in the liquid state of opening up or "digesting" coal so that its internal structure is broken down wholly or to a substantial extent into particles which are of or approach colloidal dimensions. The term "coal" is used herein to denote the carbonaceous materials of metamorphosed and decayed plant origin from the rank of "dry steam" coals down to lignite and peat, and more especially bituminous coals. We have also found that when the relative proportion of amine to "digested" particles in a mixture resulting from such digestion is such that substantially the whole of the amine present is adsorbed on the particles, the mixture, when heated within a certain temperature range, hardens in a very favourable manner which renders the mixture useful as a binding or adhesive agent. Such mixture will be referred to hereinafter and in the appended claims as a "coal-amine digestion mixture."

According to this invention, therefore, a method of uniting solids comprises incorporating between the solids to be united a coal-amine digestion mixture of the kind described above, and then causing the mixture to harden in situ by heating it at a temperature ranging from 80° C. to a temperature below the decomposition temperature of the coal used for producing the mixture.

As stated above, there are used aliphatic or araliphatic amines. The term "araliphatic amine" is used herein to denote an amine in which an amino group is attached to the aliphatic portion of an organic residue which is partly aromatic and partly aliphatic. As especially suitable amines there may be mentioned: Primary aliphatic monamines containing not more than 12 carbon atoms, for example, n-propylamine, isopropylamine, α-methylpropylamine, n-amylamine, n-dodecylamine, allylamine; alkylene diamines containing not more than 6 carbon atoms in the aliphatic chain, for example, ethylene diamine, propylene diamine or hexamethylene diamine; polyalkylene polyamines containing at least one primary amino group, for example, diethylene triamine; triethylene tetramine and tetraethylene pentamine; araliphatic amines, for example, benzylamine or β-phenylethylamine; and aliphatic hydroxy-amines containing primary, secondary or tertiary amino groups, especially monoethanolamine, diethanolamine, triethanolamine or N-hydroxyethylethylene diamine. Instead of using a single amine, a mixture of two or more amines may be used.

In producing a coal-amine digestion mixture for the purpose of the present invention it is necessary that the amine and coal should be brought into contact with one another in such manner that the amine in the liquid state can penetrate into the internal structure of the coal and break it down wholly or to a substantial extent into particles which are of or approach colloidal dimensions. The action is essentially one of adsorption, and is therefore not primarily dependent on the initial particle size of the coal. It is not essential that the amine should be initially brought into contact, for example, by simple mixing, with the coal in the proportion required to produce directly the coal-amine digestion mixture in which substantially the whole of the amine is in an adsorbed condition. Thus, an excess of the amine may be used such as to bring the whole or a part of the digested particles into dispersion in the amine. However, the hardening property is acquired only when the excess of amine has been removed sufficiently to yield the coal-amine digestion mixture in which substantially the whole of the amine is in an adsorbed condition. Any residue of the coal which cannot be digested by the amine may remain as a diluent in the coal-amine digestion mixture. Alternatively, the presence of such residue in the digestion mixture may be avoided by eliminating it at some stage, for instance, by separating it as solid undissolved matter from a liquid dispersion produced by digesting with a sufficient excess of amine to render the solid separable from the liquid.

In order to incorporate an amine digestion mixture between the solids to be united it is suitable to use either a preformed digestion mixture already containing substantially the whole of the amine in adsorbed condition, or an "initial mixture" of amine and coal leading to the formation of an amine digestion mixture in situ. The formation of the digestion mixture in situ may involve the whole or the continuance of the digestion of the coal by the amine with or without the elimination of excess amine to produce the adsorbed condition, or it may involve the elimination of excess amine from previously digested coal particles to produce the adsorbed condition.

The relative proportions of the amine and coal necessary to produce the maximum digestion and the substantially wholly adsorbed condition of the amine in a digestion mixture vary widely depending on the rank of the coal. Thus, bituminous coals of lower rank having a larger internal surface require a higher proportion of amine than those of higher rank having smaller internal surfaces. As the carbon content of the coal (calculated on the dry mineral free coal according to Parr's formula) increases from 80 per cent to 92 per cent the ratio of amine to coal, when ethylene diamine is used as the amine, decreases from about 1:4 to about 1:10 or less. After the amine and coal have been mixed together in these proportions, it is necessary that the digesting action, which then takes the form of a swelling action on the coal, should become complete before or during the heating of the mixture to bring about the binding or adhesive effect due to hardening. This swelling action may take place before or after the mixture is incorporated between the solids to be united. In the case of an amine which is solid at ordinary temperature heating may be necessary to bring the amine into the liquid state.

When a minimum proportion of amine is used such as is described in the preceding paragraph, it will be understood that the coal should be in a suitably finely divided condition in order to assist the digestion of the coal by the relatively small proportion of amine. In many cases the mixtures produced with such a proportion of amine will be solid or only slightly semi-solid before or after the swelling action is complete. For some purposes it may be desirable to prepare a mixture having a plastic or liquid consistency, for example, to enable the mixture to be worked up with a solid particulate material to form a plastic mouldable mass. This may conveniently be achieved by using an excess of the amine sufficient to give the desired consistency. Limited proportions of other liquid diluents, for example, water, not exceeding the weight of the amine may be used for this purpose, but they must not be added before the digesting action is complete, because the presence of any diluent is detrimental to the digesting action of the amine.

For some purposes it may be desirable to use so large an excess of amine that, as the result of the digestion, there is produced a liquid dispersion of the digested particles in the amine from which it is possible to remove any undissolved residue of the coal. This may be desirable as the presence of such inert residual material in the ultimate amine digestion mixture may tend to reduce its binding or adhesive properties in the hardened state. After the removal of the undissolved residue, the remaining liquid dispersion is the same as "an extract solution." A process for producing such extract solutions from bituminous coal is described in British patent specification No. 649,279 (published on January 24, 1951), and the solutions so obtained may be used in the present invention.

When mixtures, including extract solutions, containing an excess of amine are applied between the solids to be united the excess of amine must be eliminated, for example, by evaporation, to form the coal-amine digestion mixture in situ. Provided that the digestion has been completed in the presence of the excess of amine, any heating necessary to remove the excess amine will not lead to hardening, because this occurs only after the coal-amine digestion mixture containing the amine substantially wholly in the adsorbed condition has been formed. The extract solutions produced by the process of the aforesaid specification may contain too low a concentration of extract for the purpose of the present invention, and may, therefore, be concentrated before use, for example, by evaporating an appropriate amount of the amine.

It is also possible to use a solid extract obtained by precipitating the extract from an extract solution, since such a precipitate consists of the digested particles of the coal substance containing the amine adsorbed thereon, and is therefore an example of a preformed coal-amine digestion mixture. Alternatively, an extract solution may be used, and then precipitated to form the extract (coal-amine digestion mixture) in situ. Methods of precipitation are described in the above-mentioned British patent specification No. 649,279.

In order to bring about the hardening effect upon which the binding or adhesive action depends, the coal-amine digestion mixture, whether preformed or produced in situ, must be heated at a temperature ranging from about 80° C. to a temperature below the decomposition temperature of the carbonaceous material. The degree of hardening produced is greater in the upper than lower part of this temperature range, and generally an optimum hardening results at temperatures of 200–300° C. At these higher temperatures the resistance to water of the hardened coal-amine digestion mixture is also greater. The degree of hardening attained at about 80° C., but advantageously at about 100° C., suffices for many purposes. In fact moulded bodies hardened at 100° C., are in some cases strong enough to be machined in a lathe and otherwise mechanically worked. Owing to the internal structure of the coal-amine digestion mixture it is in a somewhat reactive condition, so that it may tend to undergo oxidation during the heat treatment. It may, therefore, be of advantage when such oxidation is liable to occur, to carry out the heat treatment under non-oxidising conditions, for example, in an atmosphere of an inert gas such as nitrogen.

The invention can be used in the manufacture of materials consisting of solid particles aggregated into a solid mass. The word "material" is to be understood to include the solid mass as such, and also shaped bodies or articles composed of such a mass. The coal-amine digestion mixture, when hardened in situ, serves as a permanent binding agent in the manufacture of materials of the above kind which, for their final hardening, do not require to be heated above the carbonisation temperature of the coal of the coal-amine digestion mixture. In the manufacture of materials which require to be heated at higher temperatures for their final hardening, the coal-amine digestion mixture when hardened in situ serves as a temporary binding agent in an intermediate stage of the manufacture.

Accordingly the invention also includes a process for the manufacture of solid materials consisting of aggregated solid particles, wherein a composition is prepared containing the solid particles intermixed with the coal-amine digestion mixture, and the composition is heated to harden the coal-amine digestion mixture within the temperature range described above. For preparing the composition, the solid particles to be aggregated may be mixed with a preformed coal-amine digestion mixture or with an initial mixture of an amine and coal capable of forming a coal-amine digestion mixture as described above. The composition may be prepared in the form of a plastic mass suitable for being shaped, for example, by moulding, ramming, pressing, casting or extrusion, before the hardening of the coal-amine digestion mixture. Alternatively, it may be prepared in powdered form suitable for moulding with heat and pressure to harden the coal-amine digestion mixture.

The manufacture of such solid materials includes more especially the manufacture of ceramic materials, including refractory materials, which require to be fired at high temperatures for their final hardening or bonding. For this purpose a shaped body is formed consisting of a plastic composition containing the ceramic particles intermixed with the coal-amine digestion mixture, the shaped body is heated to impart "green" strength thereto by hardening the coal-amine digestion mixture, and the body is then fired to bring about the final bonding. Heating at a temperature of about 100° C. usually suffices for imparting "green" strength. In this way refractory bricks, tiles or other articles can be made, for example, from zircon or from the fly ash from pulverized fuel furnaces. Shaped carbon bodies comprising particles of carbon bonded together in a hard, solid mass, for example, carbon electrodes and other carbon articles, when they need to be fired at high temperatures, for example, for graphitisation, can also be made in this way.

In the case of solid materials in which the coal-amine digestion mixture, when hardened, serves as a permanent binding agent, a hardening temperature of 200-300° C. should generally be used, if an optimum hardening and/or a high resistance to water is desired. In this connection the invention is especially suitable for making shaped carbon bodies comprising particles of carbon bonded together in a solid mass by means of the hardened coal-amine digestion mixture. Such carbon bodies, as well as those referred to in the preceding paragraph, may also contain a filling material, for example, asbestos, wood flour, sillimanite, fly ash or a metal powder. The composition which is subjected to hardening and contains the carbon particles and the coal-amine digestion mixture, may be a moulded plastic composition, which is subsequently heated to harden the coal-amine digestion mixture. Alternatively, it may be in a powdered form suitable for moulding with heat and pressure. In this case it is of advantage to mix the powdered carbon particles with a preformed coal-amine digestion mixture in powdered form consisting of a precipitated extract obtained as described above. Alternatively, as stated above, the carbon particles may be mixed with an extract solution, and extract precipitated in situ before moulding under heat and pressure.

Fuel briquettes can also be made in accordance with the invention by forming briquettes consisting of a composition containing particulate coal or other fuel intermixed with a coal-amine digestion mixture, and heating the briquettes to harden the coal-amine digestion mixture. The relatively low temperatures, not exceeding about 300° C., required to yield hard briquettes is an important advantage. In contradistinction to pitch, which is generally used as a binding agent for fuel briquettes, the coal-amine digestion mixtures do not increase the tendency for the briquettes to burn with a smoky flame. Moreover, the hardened coal-amine digestion mixture, owing to its internal structure, is in a highly reactive state which enhances the burning characteristics of the briquettes.

The invention also includes adhesively uniting the surfaces of shaped bodies by bringing the surfaces together with a coal-amine digestion mixture interposed between them, and heating the assembly to harden the coal-amine digestion mixture. This application of the invention is especially suitable for uniting the surfaces of carbon bodies of the kind referred to above, whether they have been made in known manner or in accordance with this invention. To obtain an optimum adhesion a hardening temperature of 200-300° C. will usually be desirable. The interposition of the coal-amine digestion mixture between the surfaces to be united may be brought about by applying a preformed coal-amine digestion mixture or an initial mixture of an amine and a coal capable of forming a coal-amine digestion mixture in situ.

In the process described above for making solid materials consisting of aggregated solid particles, in which a plastic composition is prepared before the hardening treatment, and when an initial mixture containing an excess of the amine is used for preparing the composition, the evaporation of the excess amine prior to or during the heat treatment for hardening tends to produce pores in the mass. Moreover, in the case of materials which require to be subsequently fired the burning out of the hardener coal-amine digestion mixture leads to a further increase in porosity.

This phenomenon can be utilised in the present invention in order to produce highly porous solid materials having an apparent porosity of at least 40 per cent. For this purpose, a plastic composition is prepared containing a quantity of an initial mixture containing an excess of amine sufficient to yield a final product having an apparent porosity of at least 40 per cent. The term "final product" denotes the product of the final hardening brought about either by hardening and the coal-amine digestion mixture or by subsequent firing, whichever is the final treatment.

In the manufacture of solid materials consisting of aggregated solid particles by forming the particles with a suitable liquid addition into a plastic mass prior to a hardening treatment, it is known to impart to the final product a porous internal structure by incorporating with the plastic mass a substance or mixture of substances which produces voids by the evolution of gas or vapour in the plastic mass prior to the hardening. However, there is a tendency for the porous internal structure so produced to be unstable owing to the plasticity of the mass before it hardens. In order to overcome this difficulty a setting agent has been incorporated with the plastic mass but such an addition may be undesirable or disadvantageous. The use of an initial mixture as described above has the advantage that the pore structure produced by the evaporation of the amine is stabilised by the hardening of the coal-amine digestion mixture.

A wide variety of highly porous materials, such as ceramic, including refractory, materials or carbon bodies can be made as described above. As examples there may be mentioned heat-insulating bricks, hot face insulators, ceramic filters of predetermined porosity, and porous catalytic masses which are catalysts in themselves or serve as supports for catalytic substances. Porous refractory furnace linings may be made by casting the plastic composition in situ. Any desired ceramic or refractory materials may be used, such as clay, alumina, sillimanite or zircon.

Pore formation can be made to predominate either during the heat treatment necessary for hardening or during the firing by suitably adjusting the proportions of coal and coal-amine in the amine digestion mixture. Thus, an increase in the proportion of amine increases the evolution of volatile material during the heat treatment, and an increase in the proportion of coal increases the amount of pore formation during the firing.

It is known that materials which have to be fired can be given very high porosities by incorporating in the plastic composition used in making them carbonaceous materials, such as graphite, coke, coal, cork or sawdust, which will burn out during firing to leave voids in the final product. In the present invention, in cases where the desired apparent porosity is so far in excess of 40 that it would not be possible or convenient to attain it by using the initial mixture alone, the further porosity can be produced by also adding a carbonaceous material as described above.

In the known method of producing pores by means of carbonaceous materials of the kind referred to above, the difficulty of securing uniform combustion throughout the material tends to produce an uneven distribution of pore sizes and to lead to cracking. Moreover, the carbon may not be entirely eliminated at temperatures at which there is a tendency for undesirable reaction to occur between the carbon and certain refractory materials, such as zircon. These difficulties are considerably reduced by the present invention owing to the presence of the reactive hardened coal-amine digestion mixture, which facilitates the elimination of the carbon at lower temperatures in the firing operation, and also owing to the porous structure produced in the "green" state which assists the access of air and facilitates combustion during firing.

The values of apparent porosity referred to herein are determined as follows: A specimen of the material is dried and weighed (WD). It is then saturated with water while evacuated, the vacuum is released, and the wet specimen is weighed in air (WW) and then while suspended in water (WS). The apparent porosity expressed as a $$\text{percentage} = \frac{WW - WD}{WW - WS} \times 100$$

The following examples illustrate the invention, the parts being by weight unless otherwise stated and the relationship of parts by weight to parts by volume being the same as that of the gram to the cubic centimetre: The bituminous coals used in certain of these examples are chosen from among the following:

| | Carbon content according to Parr's formula | Volatile matter content | B. S. I. Swelling number |
|---|---|---|---|
| | Percent | Percent | |
| Coal A: Weakly caking Northumberland coal. | 82 | 37 | No. 1. |
| Coal B: Welsh coking coal | 90 | 23 | Nos. 8–9. |
| Coal C: Welsh steam coal | 92 | 13 | No. 1. |
| Coal D: Yorkshire medium caking coal. | 84 | 33 | No. 5. |
| Coal E: Warwickshire non-caking coal. | 80–81 | 38 | No. 1. |

Example 1

Refractory bricks are made as follows: 1400 parts of the mixture of 2 parts of unground zircon sand and 1 part of finely divided zircon sand described in Example 2 of British patent specification No. 549,142 (accepted November 9, 1942) are mixed with 20 parts of coal A ground to pass through a 200 mesh B. S. S. sieve and 50 parts of monoethanolamine. The mixture is allowed to stand for some hours until the swelling of the coal ceases. The resulting plastic mass is moulded into the form of bricks under a pressure of 4 tons per square inch. The bricks are heated at 100° C. for 24 hours. They are then fired at 1600° C.

Instead of the above quantities of coal and monoethanolamine, there may be used 60 parts by volume of the coal extract solution described in Example 4 below.

In the procedure described in the first paragraph of this example the 50 parts of monoethanolamine may be replaced by the same quantity of benzylamine or diethanolamine, and a similar result is obtained.

Example 2

Refractory articles are made as follows: 1 part of Scotch peat is dried, then mixed with 5 parts of monoethanolamine, and the mixture is heated under reflux for 8 hours. 1 part of the resulting digestion mixture is mixed with 16 parts of a mixture of 1 part of zircon grog consisting of particles up to $\tfrac{1}{16}''$ diameter, 1 part of unground zircon sand and 1 part of zircon sand which has been finely ground so that 60 per cent of the particles are less than $50\mu$, 10 per cent less than $10\mu$ and from 1–2 per cent less than $2\mu$. The resulting mass is pressed in a semi-dry condition in moulds under a pressure of ½ ton per square inch, and the moulded shapes are heated at 110° C. for 24 hours. The resulting "green" articles have a crushing strength of several hundred pounds per square inch. They are then fired at 1300 °C.

Example 3

Asbestos tiles are made as follows: 10 parts of asbestos fibre are mixed with 50 parts of coal A ground to pass through a 200 mesh B. S. S. sieve and 30 parts of monoethanolamine. The plastic mass after being allowed to stand for several hours, is moulded into the form of tiles under a pressure of 1 ton per square inch. The tiles are then heated at 300° C. in an atmosphere of nitrogen for 24 hours. Strong crack-free tiles are obtained.

Example 4

Carbon rods are made as follows: 100 parts of graphite, which have been disintegrated to a particle size of less than 50 microns in a disintegrator of the kind described in British patent specification No. 432,191 (accepted July 22, 1935), are mixed with 60 parts of a coal extract solution obtained by extracting coal A ground to pass through a 200 mesh B. S. S. sieve with monoethanolamine by the process of the aforementioned British patent specification No. 649,279, and concentrating the solution to a content of solids of 10 per cent. The resulting plastic mass is deaerated in vacuo, and then extruded to form rods of ½" diameter. The rods are first heated at 100° C. for 24 hours, and then at 300° C. for 1 hour.

Carbon tubes having an external diameter of ½" and an internal diameter of $\frac{5}{16}$" are made in the same manner, except that the quantity of extract solution is increased to 67 parts, since the extrusion of tubes requires a more plastic material.

The procedures described above can also be carried out with a similar extract solution prepared with benzylamine.

Example 5

Carbon rods are made as follows: 60 parts of high temperature coke ground to pass a 200 mesh B. S. S. sieve are mixed with 15 parts of the extract solution used in the first paragraph of Example 2. The resulting plastic mass is deaerated in vacuo, and then extruded to form rods of ½" diameter. The rods are first heated at 100° C. for 24 hours and then at 300° C. for 1 hour.

Example 6

Carbon rods are made as follows: 75 parts of pitch coke, which has been calcined at 800° C. and ground to pass through a 200 mesh B. S. S. sieve are mixed with 15 parts of the extract solution described in the first paragraph of Example 4. 10 parts of water are also added to the mixture in order to render it capable of being extruded. The mass is deaerated in vacuo and extruded to form rods of ½" diameter. The rods are first heated at 100° C. for 3 hours and then at 300° C. for 1 hour.

Example 7

75 parts of the pitch coke used in Example 6 are mixed with 25 parts of a powdered extract obtained by precipitation from the extract solution described in the first paragraph of Example 4. The extract is precipitated by adding hydrochloric acid to the extract solution, and washing the precipitate with water to free it from acid. The powdered mixture so obtained is heated in moulds to 200° C. and then pressed at 1 ton per square inch for 15 minutes. The resulting hard moulded articles give a metallic ring when struck by a hard object.

Example 8

5 parts of the finely ground graphite described in Example 4 are mixed with 1 part of any one of coals A–E ground to pass through a 200 mesh B. S. S. sieve. To 10 parts of the resulting mixture are added 1 part of any one of the following amines: diethylene triamine, monoethanolamine, diethanolamine, triethanolamine, benzylamine, ethylene diamine, propylene diamine and N-hydroxyethyl-ethylene diamine. The mixture is allowed to stand until swelling ceases. Carbon bodies are made from the resulting mixtures by first moulding the mixtures under a pressure of 2 tons per square inch, and thereafter heating the moulded bodies at 100° C. for 24 hours and then at 300° C. for 1 hour.

Alternatively carbon rods may be made by extruding similar mixtures prepared with 5 parts, instead of 1 part, of the amines in order to give the mixture the increased plasticity necessary for extrusion.

Example 9

Fuel briquettes are prepared as follows: Coal C is ground to pass a 72 mesh B. S. S. sieve, and then mixed with 5–10 per cent of its weight of the extract solution prepared with monoethanolamine or benzylamine as described in Example 4. The mixture is then moulded into the form of oval shapes under a pressure of 2 tons per square inch. The moulded shapes are then heated at 100° C. for 24 hours and then at 300° for 2 hours. The resulting fuel briquettes have a crushing strength of over 1000 pounds per square inch, and suffer little or no loss of strength after prolonged immersion in water. They also have a good resistance to abrasion both before and after being subjected to carbonisation at 800° C.

The same result can be obtained by using instead of the above extract solution a similar proportion of the mixture of peat and monoethanolamine used in Example 2.

Example 10

Two pieces of a carbon crucible are adhesively united as follows: The surfaces of the pieces to be united are coated by brushing thereon a mixture of 1 part of low rank bituminous coal ground to pass a 200 mesh B. S. S. sieve and 3 parts of benzylamine. The coated articles are then pressed together, and the assembly is heated at 300° C. for 1 hour.

Instead of the mixture of coal and benzylamine, the coal extract solution prepared with benzylamine as described in Example 4 may be used. If desired, powdered carbon, graphite or coke may be added to the mixture or to the extract solution in order to give it more body.

The following examples illustrate the manufacture of highly porous materials in accordance with the invention:

Example 11

A hot face insulating brick is made as follows: A mixture of 100 parts of sillimanite ground to minus 14 to plus 72 mesh B. S. S., 100 parts of sillimanite ground to minus 72 to plus 200 mesh B. S. S. and 100 parts of sillimanite ground in an air swept Hardinge mill to pass through a 200 mesh B. S. S. sieve is mixed with 50 parts of coal A ground to pass through a 200 mesh B. S. S. sieve and 175 parts of monoethanolamine. The resulting mass is cast in a mould into the form of a brick, and heated in the mould at 100° C. for 24 hours. The "green" moulded product is removed from the mould and fired at 1400° C. The refractory brick so obtained has an apparent porosity of 55 per cent.

Example 12

The procedure is the same as that described in Example 11, except that the mixture of three different grain sizes of sillimanite is replaced by a mixture of 100 parts of a grog of prefired zircon sand ground to minus 14 to plus 72 mesh B. S. S., 100 parts of zircon sand of the grain size in which it occurs in nature, and 100 parts of zircon sand ground to pass through a 200 mesh B. S. S. sieve in a disintegrator of the kind described in the afore-mentioned British patent specification No. 432,191. The resulting zircon brick has an apparent porosity of 67 per cent.

*Example 13*

The procedure is the same as that described in Example 12, except that 175 parts of benzylamine are used instead of 175 parts of monoethanolamine. The zircon brick so obtained has an apparent porosity of 50 per cent.

*Example 14*

The procedure is the same as that described in Example 12, except that the 50 parts of coal A and 175 parts of monoethanolamine are replaced by 175 parts of an extract solution of 8 per cent strength obtained by treating the same coal with monoethanolamine at the boiling point. The zircon brick so obtained has an apparent porosity of 57 per cent.

*Example 15*

A porous ceramic filter is made as follows: Zircon sand is finely ground in a ball mill having steel balls to a particle size of the order of 10 $\mu$, the ground material is washed with a solution of hydrochloric acid of 6 per cent strength to remove iron abraded from the steel balls, and then dried. 190 parts of the finely ground zircon sand are mixed with 10 parts of the finely ground coal used in Example 11 and 60 parts of monoethanolamine. The resulting mass is de-aerated in vacuo, and then extruded into the form of a solid cylinder. The extruded product is heated at 100° C. for 24 hours, and then fired at 1750° C. The ceramic filter so obtained has an apparent porosity of 42 per cent.

*Example 16*

The procedure is the same as that described in Example 15, except that 150 parts of the finely ground and washed zircon sand are mixed with 40 parts of graphite disintegrated to a particle size of about 50 $\mu$ in a disintegrator of the kind described in the said British patent specification No. 432,191, 10 parts of the finely ground coal A used in Example 11 and 60 parts of monoethanolamine. The fired product has an apparent porosity of 60 per cent.

*Example 17*

A refractory brick is made as follows: Fly ash from a powdered fuel furnace is calcined, and the resulting aggregate is ground to pass a ⅛ inch sieve. 685 parts of the ground fly ash, serving as a grog, are mixed with 570 parts of the same untreated fly ash, 30 parts of the finely ground coal A used in Example 11 and 90 parts of monoethanolamine. The resulting mass is pressed in a mould into the form of a brick under a pressure of ½ ton per square inch. The moulded body is heated at 100° C. for 24 hours, and then fired at 1050° C. The brick so obtained has an apparent porosity of 43 per cent.

*Example 18*

A porous carbon block is made as follows: A mixture of 70 parts of high temperature coke ground to minus 72 to plus 200 mesh B. S. S. and 35 parts of the same coke ground to minus 200 mesh B. S. S. is mixed with 60 parts of an extract solution of 8 per cent strength obtained by treating the coal described in Example 11 with monoethanolamine at the boiling point. The resulting mass is poured into a mould and heated therein at 100° C. for 12 hours.

We claim:

1. A method of uniting solids with the aid of a binding or adhesive agent, wherein a coal-amine digestion mixture is incorporated between the solids to be united, and the digestion mixture is caused to harden in situ by heating it at a temperature ranging from 80° C. to a temperature below the decomposition temperature of the coal used for producing the digestion mixture.

2. A method as claimed in claim 1, wherein the coal-amine digestion mixture has been produced with a bituminous coal having a carbon content within the range of 80–92 per cent.

3. A method as claimed in claim 1, wherein the coal-amine digestion mixture is incorporated between the solids to be united by applying a preformed coal-amine digestion mixture.

4. A method as claimed in claim 1, wherein the coal-amine digestion mixture is incorporated between the solids to be united by applying an initial mixture of amine and coal leading to the formation of a coal-amine digestion mixture in situ.

5. A method as claimed in claim 4, wherein the initial mixture is one in which the digestion of the coal by the amine has occurred incompletely or not at all.

6. A method as claimed in claim 4, wherein the initial mixture contains a proportion of amine in excess of that required in order that substantially the whole of the amine in the coal-amine digestion mixture shall be in an adsorbed condition.

7. A method as claimed in claim 4, wherein the initial mixture contains coal digested in a proportion of the amine in excess of that required in order that substantially the whole of the amine in the coal-amine digestion mixture shall be in adsorbed condition.

8. A method as claimed in claim 7, wherein the initial mixture is an extract solution which has been obtained by extracting the coal with the amine and which is free from undissolved residue.

9. A method as claimed in claim 3, wherein the preformed coal-amine digestion mixture consists of an extract containing adsorbed amine and obtained by precipitation from an extract solution which has been obtained by extracting the coal with the amine and which is free from undissolved residue.

10. A method as claimed in claim 1, wherein the coal-amine digestion mixture contains a primary aliphatic monamine having not more than 12 carbon atoms.

11. A method as claimed in claim 1, wherein the coal-amine digestion mixture contains an aliphatic hydroxy-amine.

12. A method as claimed in claim 11, wherein the amine is selected from the group consisting of monoethanolamine, diethanolamine, triethanolamine and N-hydroxyethyl-ethylene diamine.

13. A method as claimed in claim 1, wherein the coal-amine digestion mixture contains an alkylene diamine having not more than 6 carbon atoms in the aliphatic chain.

14. A method as claimed in claim 13, wherein the amine is selected from the group consisting of ethylene diamine, propylene diamine and hexamethylene diamine.

15. A method as claimed in claim 1, wherein the coal-amine digestion mixture contains a polyalkylene polyamine containing at least one primary amino group.

16. A method as claimed in claim 15, wherein the amine is selected from the group consisting of diethylene triamine, triethylene tetramine and tetraethylene pentamine.

17. A method as claimed in claim 1, wherein the coal-amine digestion mixture contains an amine selected from the group consisting of benzylamine and phenylethylamine.

18. A process for the manufacture of materials consisting of solid particles aggregated into a solid mass, wherein a composition is prepared containing the solid particles intermixed with a coal-amine digestion mixture, and the composition is heated to cause the digestion mixture to harden at a temperature ranging from 80° C. to a temperature below the decomposition temperature of the coal used.

19. A process for the manufacture of a ceramic material, wherein a shaped body is formed consisting of a plastic composition containing the ceramic particles intermixed with a coal-amine digestion mixture, the shaped body is heated to impart "green" strength thereto by hardening the digestion mixture at a temperature ranging from 80° C. to a temperature below the decomposition temperature of the coal used, and the body is then fired to bring about the final bonding.

20. A process for the manufacture of carbon bodies, wherein a shaped body is formed consisting of a plastic composition containing particles of carbon intermixed with a coal-amine digestion mixture, the shaped body is heated to impart "green" strength thereto by hardening the digestion mixture at a temperature ranging from 80° C. to a temperature below the decomposition temperature of the coal used, and the body is subsequently fired.

21. A process for the manufacture of carbon bodies comprising particles of carbon bonded together by means of a hardened coal-amine digestion mixture, wherein a shaped composition is formed containing the carbon particles intermixed with a coal-amine digestion mixture, and the shaped body is heated to harden the digestion mixture at a temperature ranging from 80° C. to a temperature below the decomposition temperature of the coal used for producing the digestion mixture.

22. A process as claimed in claim 21, wherein the composition is first shaped in the plastic state, and the resulting shaped body is subjected to the heat treatment.

23. A process as claimed in claim 21, wherein a powdered composition containing the carbon particles and coal amine digestion mixture is moulded with heat and pressure to harden the digestion mixture.

24. A process as claimed in claim 21, wherein the hardening treatment is carried out at a temperature within the range of about 200-300° C.

25. A process as claimed in claim 18, wherein in the preparation of the composition containing the solid particles intermixed with the coal-amine digestion mixture the composition is prepared in the plastic state with a quantity of an initial mixture containing an excess of amine sufficient to yield a final product having an apparent porosity of at least 40 per cent.

26. A process for the manufacture of fuel briquettes, wherein briquettes are formed consisting of a composition containing the particles of a solid fuel intermixed with a coal-amine digestion mixture, and the briquettes are heated to harden the digestion mixture at a temperature ranging from 80° C. to a temperature below the decomposition temperature of the coal used for producing the digestion mixture.

27. A process for adhesively uniting the surfaces of shaped bodies, wherein the surfaces to be united are brought together with a coal-amine digestion mixture interposed between them, and the assembly is heated to harden the amine digestion mixture at a temperature ranging from 80° C. to a temperature below the decomposition temperature of the coal used for producing the digestion mixture.

28. A process as claimed in claim 27, wherein the surfaces to be united are those of shaped carbon bodies.

IAN GORDON CUMMING DRYDEN.
JAMES HUNTER McKEE.

References Cited in the file of this patent

UNITED STATES PATENTS

| Number | Name | Date |
|---|---|---|
| 2,049,013 | Lowry | July 28, 1936 |
| 2,133,280 | Burk | Oct. 18, 1938 |
| 2,310,795 | La Plana et al. | Feb. 9, 1943 |
| 2,334,545 | D'Alelio | Nov. 16, 1943 |
| 2,453,543 | Schabelitz | Nov. 9, 1948 |
| 2,514,789 | Orth | July 11, 1950 |
| 2,527,596 | Shea et al. | Oct. 31, 1950 |

FOREIGN PATENTS

| Number | Country | Date |
|---|---|---|
| 510,256 | Great Britain | July 31, 1939 |
| 586,538 | Great Britain | Mar. 21, 1947 |